(12) United States Patent
Berg et al.

(10) Patent No.: US 9,148,504 B2
(45) Date of Patent: Sep. 29, 2015

(54) METHOD AND SYSTEM FOR SINGLE-ENDED LINE TESTING

(71) Applicant: Telefonaktiebolaget L M Ericsson (publ), Stockholm (SE)

(72) Inventors: Miguel Berg, Upplands Väsby (SE); Daniel Cederholm, Sollentuna (SE); Chenguang Lu, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/117,353

(22) PCT Filed: Oct. 14, 2013

(86) PCT No.: PCT/SE2013/051201
§ 371 (c)(1),
(2) Date: May 13, 2014

(87) PCT Pub. No.: WO2015/057114
PCT Pub. Date: Apr. 23, 2015

(65) Prior Publication Data
US 2015/0103981 A1    Apr. 16, 2015

(51) Int. Cl.
*H04M 1/24* (2006.01)
*H04M 3/08* (2006.01)
*H04M 3/22* (2006.01)
*H04M 3/30* (2006.01)
(Continued)

(52) U.S. Cl.
CPC ............... *H04M 3/306* (2013.01); *H04L 5/14* (2013.01); *H04M 3/304* (2013.01); *H04M 11/062* (2013.01)

(58) Field of Classification Search
CPC ...... H04M 3/304; H04M 11/062; H04B 3/46; H04B 1/44; G06F 13/4086
USPC ............ 379/1.01, 1.03, 1.04, 9, 10.01, 15.01, 379/21, 22, 22.01, 22.02, 22.03, 22.08, 23, 379/24, 27.01, 27.03, 29.01, 30
See application file for complete search history.

(56) References Cited

U.S. PATENT DOCUMENTS 6,144,721 A *  11/2000 Stephens ................... 379/21
7,013,257 B1 *  3/2006 Nolan et al. ............... 703/28
2002/0176490 A1  11/2002 Kamali et al.
(Continued)

FOREIGN PATENT DOCUMENTS

WO    2008008015 A2    1/2008

OTHER PUBLICATIONS

"Series G: Transmission Systems and Media, Digital Systems and Networks", ITU-T G.994.1, Jun. 2012, 881 pages.
(Continued)

*Primary Examiner* — Binh Tieu
(74) *Attorney, Agent, or Firm* — Nicholson De Vos Webster & Elliott LLP

(57) ABSTRACT

The present disclosure relates to a method, a node, a system and a computer program for input impedance measurements in the form of return loss measurements, such as single-ended line testing. The disclosure also relates to a communication system having a near-end terminal and at least one far-end terminal. The near-end terminal is capable of communicating instructions to the far-end terminal in order for the near-end terminal to perform echo impulse response measurements on subsequent states of impedance for comparing, analyzing and for enabling improved localization of faults.

20 Claims, 8 Drawing Sheets

(51) Int. Cl.
*H04L 5/14* (2006.01)
*H04M 11/06* (2006.01)

(56) References Cited

U.S. PATENT DOCUMENTS

2006/0251221 A1* 11/2006 Rosenberg ................. 379/22.01
2008/0150585 A1* 6/2008 Warner et al. .................. 326/90
2008/0205501 A1* 8/2008 Cioffi et al. .................. 375/224
2009/0168972 A1* 7/2009 Cioffi et al. .................. 379/1.04
2011/0161027 A1 6/2011 Ericson et al.
2012/0074952 A1 3/2012 Chappell et al.

OTHER PUBLICATIONS

Stephens, Randy, "Active Output Impedance for ADSL Line Drivers", Texas Instruments, Application Report, SLOA100, Nov. 2002, 52 pages.

International Search Report and Written Opinion, Application No. PCT/SE2013/051201, dated Jul. 3, 2014, 11 pages.

* cited by examiner

METHOD AND SYSTEM FOR SINGLE-ENDED LINE TESTING

CROSS-REFERENCE TO RELATED APPLICATIONS

This application is a National stage of International Application No. PCT/SE2013/051201, filed Oct. 14, 2013, which are hereby incorporated by reference.

TECHNICAL FIELD

The present disclosure relates to a method, a node, a system and a computer program for single-ended line testing, The disclosure relates to a communication system having a near-end terminal and at least one far-end terminal. The near-end terminal is capable of communicating instructions to the far-end terminal in order for the near-end terminal to perform echo measurements on subsequent states of impedance for comparing, analyzing and enabling improved loop qualification and for localization of faults.

BACKGROUND

In the industrialized world of today, most homes and businesses are connected to telephone networks using twisted pair copper wires, Those copper wires were originally used solely to carry data traffic in the analogue voice band. However, with the advancement of technology, and in particular the advancement of Digital Subscriber Line, DSL, access technology, the transfer of data over the higher frequencies in the twisted pair copper wires was made possible. The greatest advantage of DSL is that it enables data to be exchanged over the twisted pair copper wires at much higher speeds than conventional modems and analogue lines. The speeds at which data is exchanged over DSL now exceed 200 Mbit/s downstream using the current access technology standard very-high-bit-rate digital subscriber line 2 (VDLS2). Despite high transmission rates of today, DSL access technology is still being developed towards even higher transmission rates. A working name used in current standardization efforts for the next generation of time-division duplex DSL-based access technology is "G.fast".

In more detail, G.fast is the ITU-T internal working name for a future communication standard intended to provide close to gigabit rates on short copper cables, e.g. 100-200 meters of telephony cable.

DSL communication systems support high-speed data links between on the one side a distribution point unit, possibly being part of central office equipment of a communication service provider, operator or network operator, and on the other side one or more residential network terminals serviced by the distribution point unit. In an ADSL or IDSL communication system, an available spectrum is subdivided into a plurality of tones, each of which carries either downstream information from the distribution point unit to a customer premises equipment, or upstream information from the customer premises equipment to the distribution point unit. While the distribution point unit may provide service to a plurality of customer premises equipments, each piece of serviced customer premises equipment is coupled to the distribution point unit via a respective twisted pair of wires. Often, a large number of customer premises equipment connections are bundled together in one cable, That cable is in turn connected to a cabinet managed by an operator, network operator or other service provider.

The quality of the communication channel provided by a respective twisted pair or wires that couple the customer premises equipment to its servicing distribution point unit will have a substantial impact on the transmission capacity and quality that may be achieved between the communicating terminals. The quality of the communications channel between the distribution point equipment and the serviced customer premises equipment depends upon a number of factors. One of these factors is distance, i.e. the distance from the distribution point unit to the customer premises equipment, as signal attenuation increases with increased distance. Another factor is media quality, e.g. type of media, number of connections, etc. Still another factor is interference that may be coupled to the twisted pair of copper wires, often produced by a neighboring connection or by neighboring customer premises equipment that transmit signals in the same frequency band.

Single Ended Line Testing, SELT, is practically a standardized test method for loop qualification, performance predication/estimation and troubleshooting of copper cables. It consists of two kinds of measurements. The first is a noise measurement typically referred to as Quiet Line Noise, QLN, test and the second is echo measurement.

Echo measurements can be implemented in different ways, for instance as time domain reflectometry, TDR, using steps or pulses, or as frequency domain reflectometry, FDR, using continuous narrowband or wideband signals. Conversion between the time domain and the frequency domain is possible using for example various Fast Fourier Transform, FFT, techniques. From echo measurements, one can determine return loss (i.e. S11), input impedance, and echo response.

US patent application 2011/0161027 describes how to make at least two echo measurements with different far-end impedances, for open lines and short-circuited lines, whereby SELT estimation of a transfer function for a line can be improved, SELT is typically performed at the central office or on the DSLAM side of the communication line and thus, the line test is remotely activated by the operator. To keep the cost of operation as low as possible, it is desirable to use methods that that avoid the need, for manual intervention by operators at the far-end side. Also because of cost reasons and the desire to avoid the addition of unnecessary complexity, it cannot be motivated to use of a specific piece of equipment for altering the impedance at the far-end side. A further limitation, which is related to the disclosure of the patent application referred to, is that both open termination and short-circuit termination is needed at the far-end side, while active customer premises equipment typically has an impedance value which is closely matched to the impedance value of the communication line.

One of the shortcomings of SELT with active customer premises equipment is that matched impedance will weaken the echo signal from the CPE. If there are other echo sources, such as splices and bridge-taps, a signal from those other echo sources may even be stronger than the echo signal reflected from the CPE and therefore it will be hiding that particular echo signal. With strong echo reflections and a hidden CPE echo signal, the location of the CPE becomes difficult to determine, which is important for further localization of faults and for loop qualification. Strong echoes are easier to localize, but even with an open-end terminal, i.e. without a CPE terminal, it gets difficult to identify the echo belonging to the far-end side terminal.

The above mentioned shortcomings and problems related to prior art therefore need to be solved.

SUMMARY

It is therefore an object of the present disclosure to alleviate the shortcomings of prior art, as described above.

This object is achieved by a method for single ended line testing, in a communication system having a near-end terminal, such as distribution point unit, and at least one far-end terminal, such as a piece of customer premises equipment, the near-end terminal being capable of communicating instructions to the far-end terminal. The method comprises the steps of the near-end terminal instructing the far-end terminal to exercise a first state of impedance, the near-end terminal performing a first echo measurement and recording the measurement result, in accordance with a predetermined signaling scheme, the near-end terminal instructing the far-end terminal to change its impedance from a first state to a second state, the second state of impedance being different from the first state, the near-end terminal performing a second echo measurement and recording the measurement result, and utilizing the difference between the first and the second states of impedance in a processing means to determine a relation there between as a basis for one or more of loop qualification, fault detection and fault localization on the communication line between the near-end and the far-end terminals.

An advantageous effect of the method according to the present disclosure is that more accurate measurement results can be obtained as compared to previously known technology. Moreover, loop qualification, fault detection and fault localization are greatly improved and thus the need to dispatch a field operator or trained technician for troubleshooting is avoided. Sending out field operators is costly and avoiding the need for manual service and maintenance is highly advantageous, in particular to the communication service provider, operator or network operator, but also for the end customer who would otherwise indirectly have to pay for that service.

In accordance with an exemplary embodiment of the present disclosure, the first and the second impedance states are any value between open and short-circuited terminal impedances, whereby high, low, matched impedance values are attainable. An advantage of this over prior art solutions is that it gives many more options as compared to previously known SELT measurement methods.

The impedance alternation may be controlled by changing the transceiver states. For example, changing the on/off states of the line driver and line receiver can change the impedance of the CPE.

The impedance alternation may also be controlled by powering on/off the far-end terminal, when the far-end terminal is powered remotely from the near-end terminal, e.g. via Power-over-Ethernet (PoE), Remote Feeding for Telecom (RFT) or similar technology. The far-end termination impedance could be changed by disabling the power to the far-end terminal. The resulting termination impedance, at power down, will depend on the design of the far-end transceiver but will typically deviate significantly from matched, at power up. An advantage with this approach is that the far-end terminal does not have to be adapted to control the impedance.

According to another embodiment of the disclosure, the signaling scheme comprises a request signal being sent from the near-end terminal to the far-end terminal for the far-end terminal to change from the mentioned first state of impedance to the mentioned second state of impedance.

According to yet another embodiment of the disclosure, the signaling scheme comprises a request signal being sent from the near-end terminal to the far-end terminal in order for the far-end terminal to change from the first state of impedance to the second state of impedance during specific periods of time when the far-end transmitter is in a start-up phase.

According to a further exemplary embodiment of the present disclosure, the signaling scheme comprises monitoring and detection by the near-end terminal of the timing of the far-end terminal's states of operation by measuring the time duration of when handshake tones are transmitted or not.

The mentioned three exemplary embodiments all relate to the adaptability of the present disclosure to different signaling schemes, different transmission and access technologies, while maintaining the benefits of the disclosure and keeping all possible advantages and foreseeable opportunities.

As mentioned with reference to related technology, it is known that SELT measurements with both open and short-circuited termination can be used to improve transfer function estimates.

By means of the present disclosure, it is possible to improve fault localization using SELT measurements with at least two different termination impedances. An advantageous effect is that these impedances do not have to be open and short-circuited, but could be any impedance value in-between giving measurable differences in the echo.

DETAILED DESCRIPTION

The present disclosure is not limited to communications networks, but shall be applicable to any means capable of performing echo measurements on a metallic cable.

Figure 1:
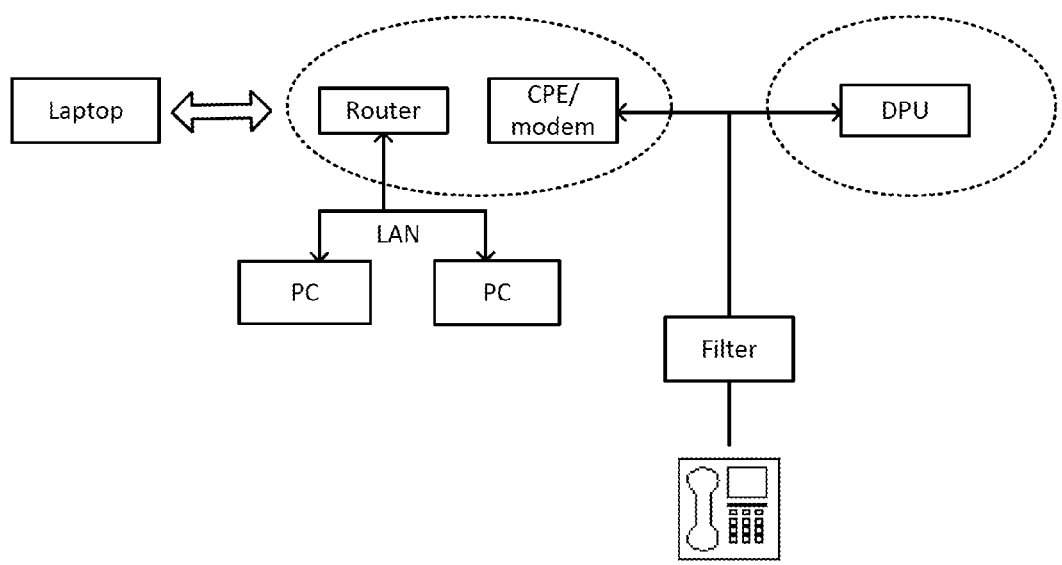
FIG. 1 is schematic representation of a set-up of a DSL connection and its typical pieces of equipment.

FIG. 1 shows a schematic diagram of a DSL connection. One the right side of the picture within the dashed ellipse, a distribution point unit resides on the communication line connecting the communication provider's central office, its distribution point unit, DPU, or by older terminology, its digital subscriber line access multiplexer, DSLAM, or a street cabinet. The rest of the equipment reside on the customer side and on the left side within the dashed ellipse is shown the customer premises equipment, CPE, with an optional router, oftentimes integrally built with the residential modem, i.e. with the CPE. This router manages a local area network, LAN, to which can be connected a number of personal computers or consumer electronics devices of various types. A wireless functionality of the same router also manages a wireless local area network, WLAN, to which can be connected a number of laptop computers, iPads or any other wireless consumer electronics equipment.

SELT with active CPE is greatly advantageous, since troubleshooting is of such importance to operators, primarily for cost reasons. Accurate SELT results significantly reduce costs of operation. For example, localizing a fault and determining whether or not it is inside or outside a house is crucial, since operators are liable for faults only on their side of a predetermined demarcation point of a connection. SELT could be used over time as a performance monitoring solution and is such applications, active customer premises equipment are a common far-end termination.

When an active CPE is available, it is commonly known in the art to use so-called Double-Ended Line Test, DELT, also called loop diagnostics, in VDSL2 access technology. This type of diagnostics can be used to identify some faults, but more accurate fault localization still requires SELT measurements. As mentioned above, SELT is typically performed from one side of a communication line without any active measures or actions expected from the far-end terminal side, for both technical performance and cost-related reasons. Thus, impedance at the far-end terminal side is generally unknown. The value of the far-end impedance does however highly affect the echo signal during measurement, and consequently also the result of a SELT measurement session.

The present disclosure provides various methods to conduct SELT measurements on different impedances, by causing different termination impedance states through controlled operation of line drivers and line receivers, and scheduling different impedance states at different times for SELT measurements. Alteration of impedance states can be done autonomously from the CPE side during an initial phase, when communication is established, a so-called handshake process. As an alternative, impedance state alteration can be requested by the DPU when monitoring and using ordinary handshake messages.

With an active CPE on the line, the far-end termination impedance seen by SELT is the input impedance of the CPE. Adding special transceiver circuitry only for the purpose of changing the input impedance is generally undesired, since it adds cost and complexity and could also degrade performance during normal operation. However, it may be possible to change the input impedance by using existing functionality for a different purpose or putting the transceiver in a state that does not occur during normal transmission and reception.

The input impedance of a CPE, at the far end, is determined by the analog front end, AFE, which is comprised of two parts: a line driver and a line receiver. Line driver is an amplification circuitry at the last stage of a transmitter chain. Line driver is optimized for delivering high power. The output signal from a DAC, including some filtering and pre-amplifications, is amplified by the line driver and sent to the cable medium, Line receiver is also an amplification circuitry at the first stage of a receiver chain. Line receiver is optimized to amplify low power signals with low noise figure. The received signal from the cable medium is amplified by the line receiver and sent to an ADC, including some filtering and further amplifications, for subsequent digital processing.

Basically, the input impedance of a CPE, far end, is determined by the operational states of the line driver and the line receiver. In an FDD system, the line driver and the line receiver are always in the "on" state for normal operation. In this case, the input impedance is designed to be matched to the medium when both line driver and line receiver are on, in a TDD system, during the transmitting time slots the transceiver operates on a transmit mode, where the line driver is on and the line receiver is off. For the transmit mode, the input impedance is normally optimized to be matched or high impedance. During the receiving time slots, the transceiver operates on a receive mode, where the line driver is off and the line receiver is on. For the receive mode, the input impedance is optimized to be matched. The mentioned "off" state is achieved by disabling the line driver and line receiver by reducing the bias voltage of the amplifiers involved, respectively, from the normal bias voltage.

Using other combinations of the on/off states of the line driver and line receiver than that used in the normal operation described above can produce other input impedance values. For example, in a typical FDD transceiver design, very high impedance can be achieved by turning off both line driver and line receiver. In a typical TOD design, turning off both line driver and line receiver can also produce high impedance. Using other combinations can also produce low input impedance.

The impedance alternation may also be controlled by powering on/off the far end terminal, when the far-end terminal is powered remotely from the near-end terminal, e.g. via Power-over-Ethernet (PoE), Remote Feeding for Telecom (RFT) or similar technology. The far-end termination impedance could be changed by disabling the power to the far-end terminal, The resulting termination impedance, at power down, will depend on the design of the far-end transceiver but will typically deviate significantly from matched, at power up. An advantage with this approach is that the far-end terminal does not have to be adapted to control the impedance.

The present disclosure is applicable for use with any combination of two or more impedances as long as they are different, and measurement results will depend on the difference in reflection coefficient, i.e. differences in magnitude and/or phase, between the termination and the transmission line.

To start communication between a DPU and a CPE, one of them must first inform the other about its presence. This information procedure is defined in the ITU-T Recommendation G.994.1 and information about its presence is achieved by the CPE transmitting handshake tones when it is not in show time. The DPU will then listen to the line and as soon as it detects handshake tones transmitted by the CPE it will respond and start an initialization sequence.

Handshake can be used to co-ordinate the it impedance changes and the SELT measurements in different ways.

Figure 2:
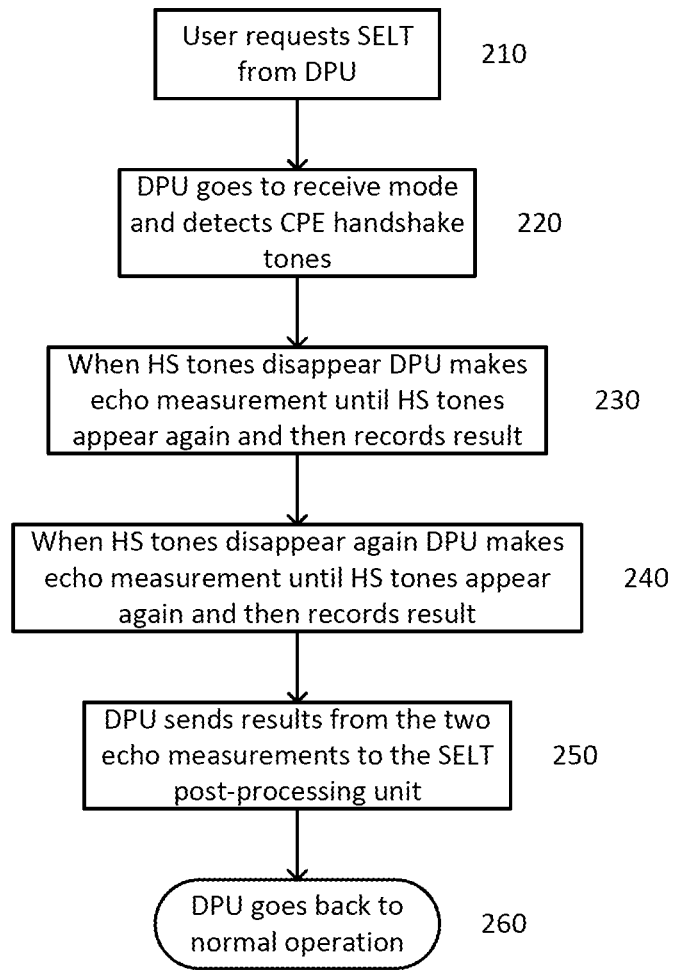
FIG. 2 depicts a flowchart in which the DPU controls the CPE and measures its varying states o impedance integrally with the handshake procedure.
Figure 3:
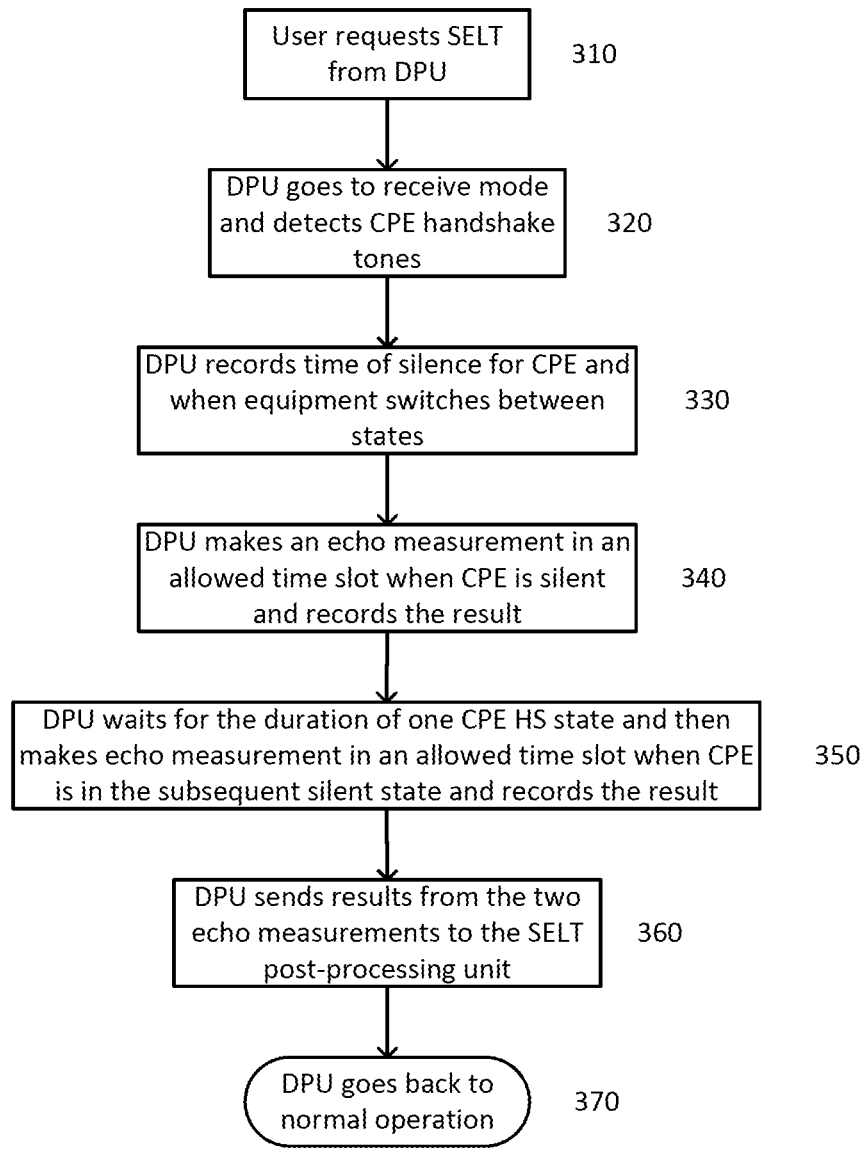
FIG. 3 depicts a flowchart in which the DPU controls the CPE and measures its varying states of impedance by monitoring the signaling and silent time slots respectively, during the handshake procedure.

With reference to FIG. 2, a flowchart is depicted in which the DPU controls the CPE and measures its varying states of impedance integrally with the handshake procedure (210-260). FIG. 3 depicts a flowchart in which the DPU controls the CPE and measures its varying states of impedance by monitoring the signaling and silent time slots respectively, during the handshake procedure (310-370). More in detail, the procedures are as follows: The handshake tone transmitting mode, the "HS" mode, should be set to a given period of time. After that time the CPE will switch to a "silent" transceiver state for a given period of time. It will then go back to HS mode before it enters a second transceiver state again. The CPE will then cycle through these states until the DPU responds to the handshake.

Alternatively the DPU records for how long time the handshake tones are sent, how long time the CPE is silent, and at which timing instances the CPE switches states. When the timing is known by the DPU it schedules an echo measurement for the next available downstream or line testing slot in which the CPE is silent, and then another echo measurement for the next silent CPE slot, since the CPE will then have switched impedance states. The impedance values the different transceiver states can later be detected during SELT post-processing.

Figure 4:
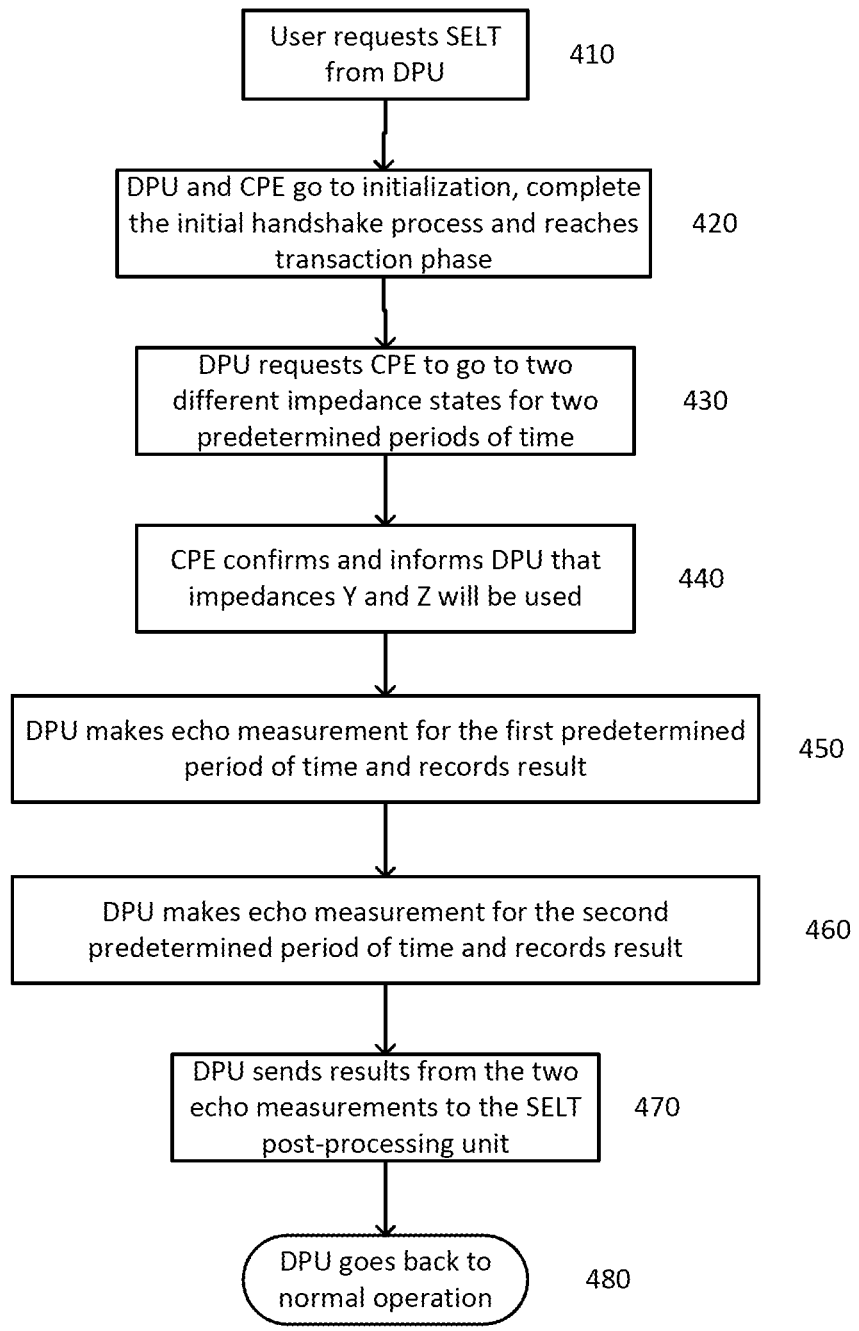
FIG. 4 depicts a flowchart in which the DPU controls the CPE to exercise a first state of impedance and then change to a second state of impedance, all in predetermined periods of time, whereby the DPU uses the opportunity to measure the states of impedance for later analysis.
Figure 5:
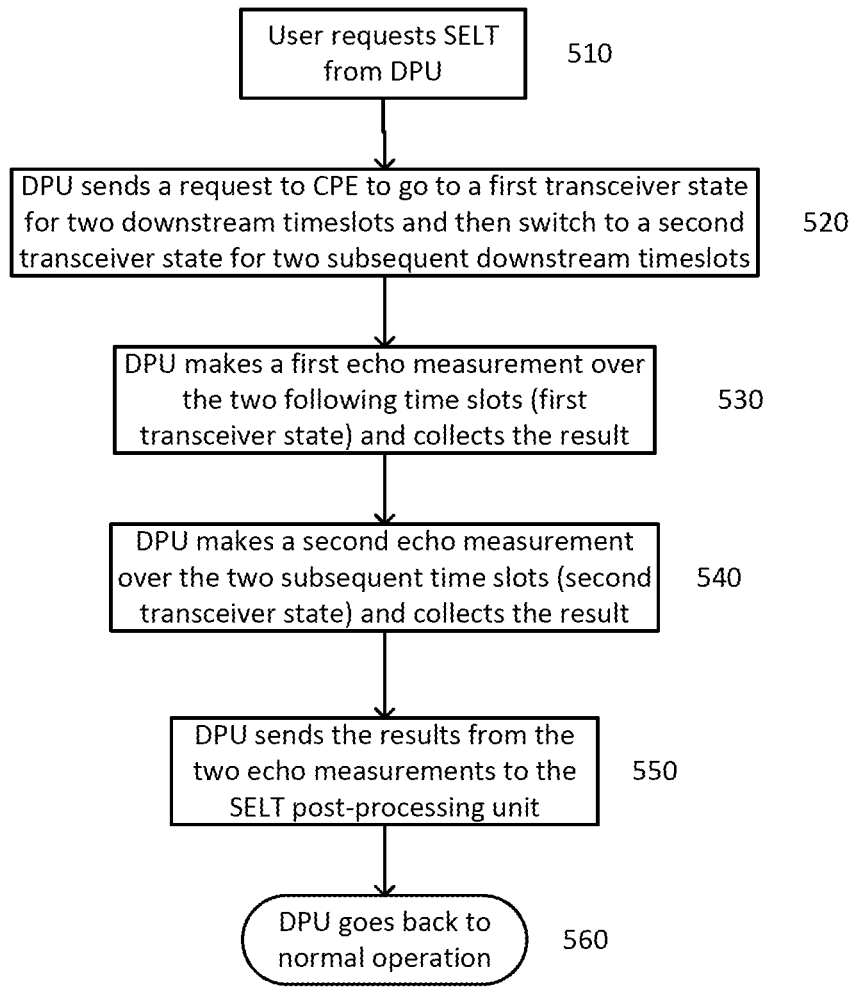
FIG. 5 depicts a flowchart in a time-division duplex environment, in which the DPU controls the CPE to exercise a first state of impedance and then change to a second state of impedance, all in predetermined periods of time, whereby the DPL) uses the opportunity to measure the states of impedance for later analysis.

In FIG. 4 is illustrated a flowchart in which the DPU controls the CPE to exercise a first state of impedance and then change to a second state of impedance, all in predetermined periods of time, whereby the OPU uses the opportunity to measure the states of impedance for later analysis (410-480). Referring to FIG. 5, a flowchart in a time-division duplex environment is depicted, in which the DPU controls the CPE to exercise a first state of impedance and then change to a second state of impedance, all in predetermined periods of time, whereby the DPU uses the opportunity to measure the states of impedance for later analysis (510-560).

Figure 6:
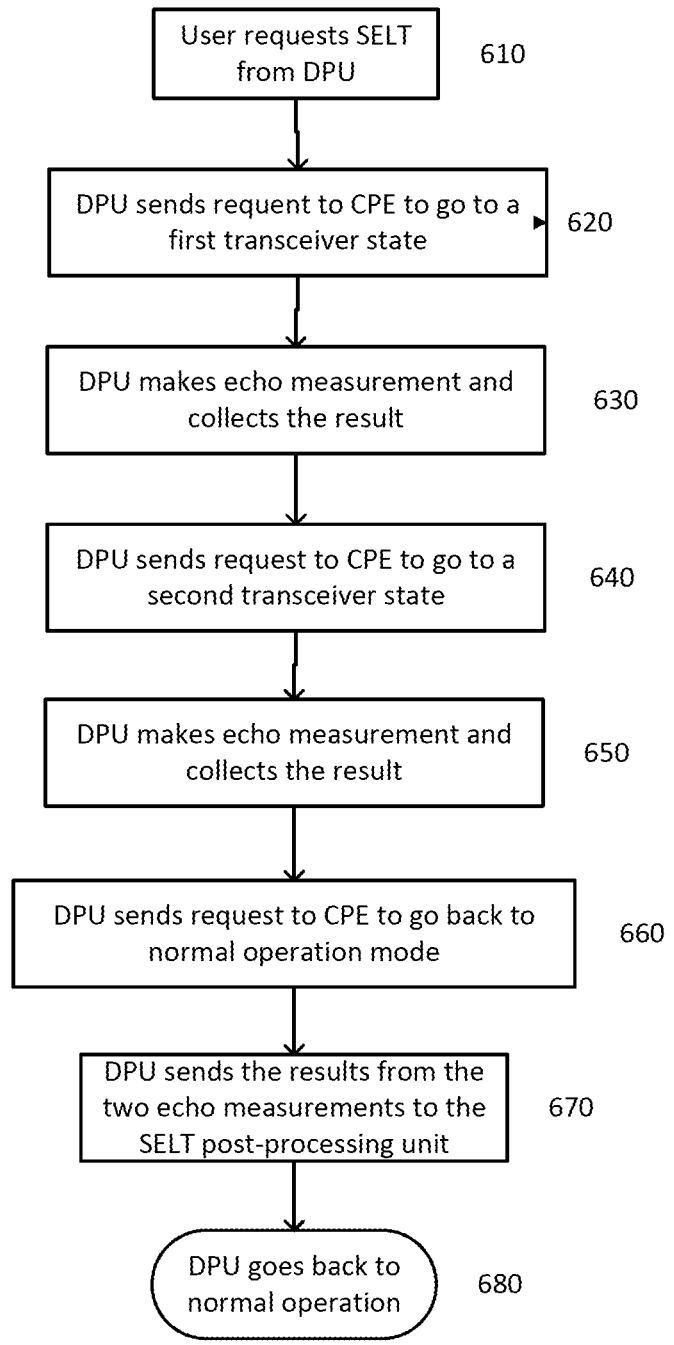
FIG. 6 depicts a flowchart in which the DPU controls the CPE to exercise a first state of Impedance for a first measurement session and then to change to a second state of impedance for a second measurement session followed by post-processing and analysis.

With reference to FIG. 6, a flowchart is illustrated in which the DPU controls the CPE to exercise a first state of impedance for a first measurement session and then to change to a second state of impedance for a second measurement session followed by post-processing and analysis (610-680).

Figure 7:
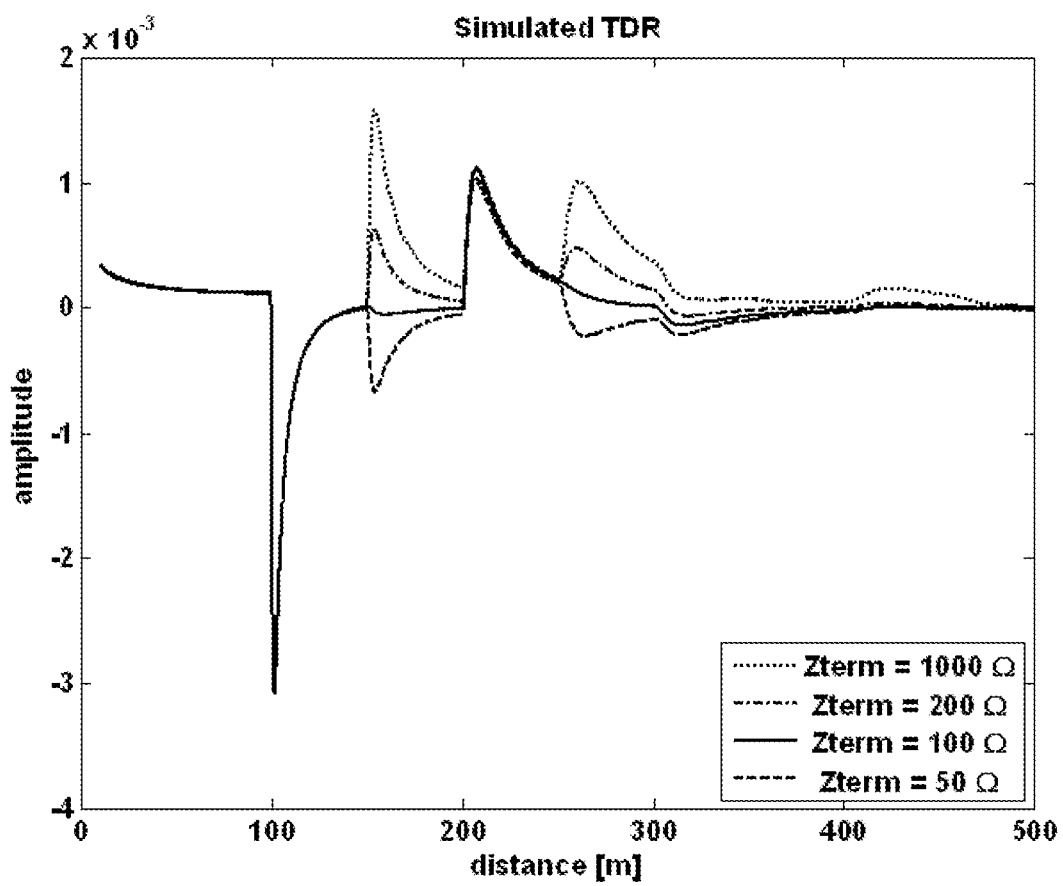
FIG. 7 is a simulation of echo impulse response measurements with different far end impedances where the far-end terminal (CPE) is at 150 meters, showing there is another strong echo peak at 200 meters from a bridge tap, which would overestimate the location of the far-end terminal if the CPE is matched with 100 ohm impedance.
Figure 8:
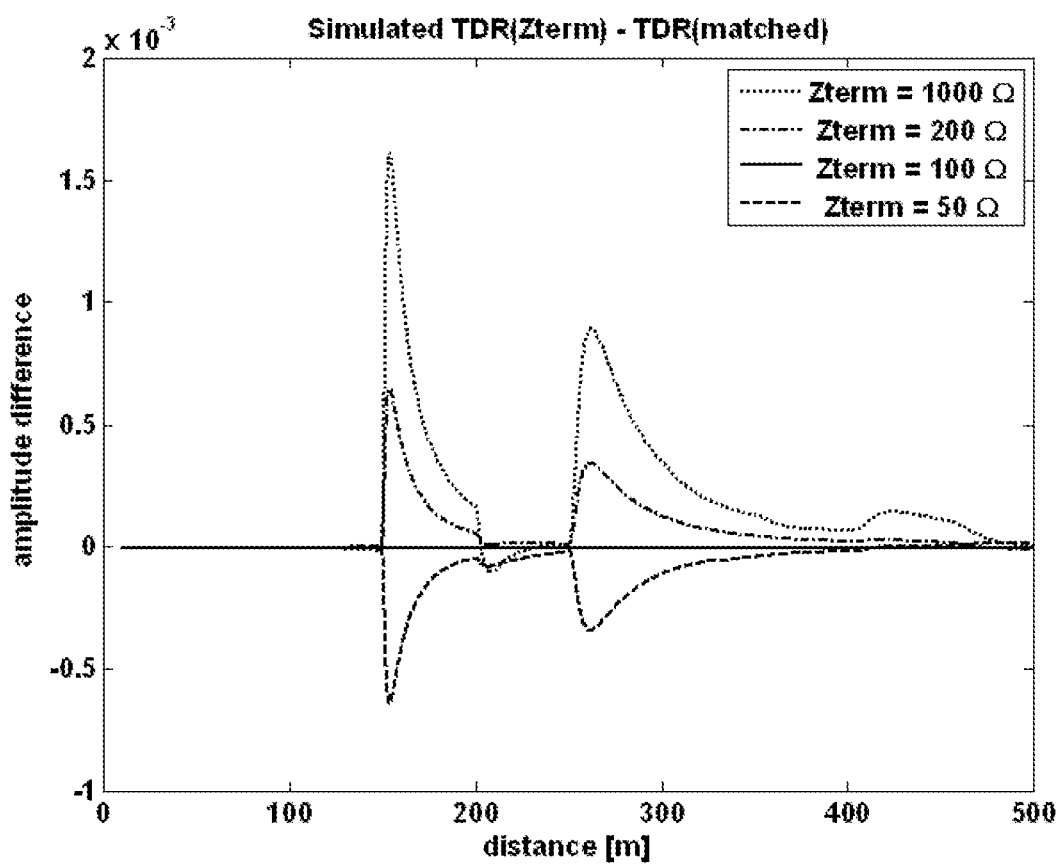
FIG. 8 is a simulation of the difference between the measured echo impulse response and the echo impulse response with matched impedance (100 ohm), showing the false peak (second peak in FIG. 7) is removed.

FIG. 7 shows a diagram of a simulation of echo impulse response measurements with different far end impedances where the far end (CPE) is at 150 meters, showing there is another strong echo peak at 200 meters from a bridge tap, which would overestimate the location of the far end if the CPE is matched with 100 ohm impedance. FIG. 8 shows a diagram of a simulation of the difference between the measured echo impulse response and the matched echo impulse response with matched impedance (100 ohm), showing another strong echo peak at 200 meters is removed. So the far-end location can be easily determined correctly at 150 meters by simple processing if a different impedance is used for the second echo measurement.

To start a communication between two modems they first need to exchange their capabilities, agree on modes of operations, etc. This procedure is referred to as handshake is defined in the previously mentioned standard ITU-T Recommendation G.994.1. This standard describes both handshake procedures initiated by the near-end and by the far-end modem but in practice it is typically initiated by the far-end modem.

As described before, in the handshake procedure, the DPU and the CPE can communicate after the handshake enters into the transaction state. This communication can be used for line testing purposes. For example, loop diagnostic operation DELT can be requested from either end using handshake messages. This communication is then used to coordinate impedance switching at the CPE and the SELT measurement from the DPU.

The CPE may also perform a normal handshake operation until an impedance switching request is received. In this case, the DPU side may control the length of the time period for SELT measurement and the impedance changes. The CPE can report or confirm that the impedance will be changed and to which impedance state it will be changed.

The SELT measurement for one impedance state can be requested by means of a handshake process. The SELT measurements can also be combined with several impedance states with one handshake process. The DPU can schedule a long SELT time period and specify each sub time slot for impedance change.

In a system with more than one channel between near-end and far-end terminals, for instance bonded systems with multiple twisted pairs or FDD systems, impedance control commands could be sent directly on a second channel This does not require changes to the handshake procedure and avoids that control is lost during measurement.

The described handshake-based SELT methods require a stop to the line for running SELT in a dedicated line testing mode during the handshake phase. However, SELT can be run in so-called show time with impedance switching for TDD systems.

One solution for switching impedance is that the whole SELT sequence with information for when and how the impedances should be changed is defined in the standard and that the DPU sends a request to start a standardized SELT procedure. Another solution is to use an advanced request message including all relevant information of the SELT procedure. Both the near-end and far-end terminals would be informed about the time and the requirements when running the SELT sequence by the use of the request from the near-end terminal to the far-end terminal. A third option would be to simplify the request message send one request message every time the CPE is to change states.

The invention claimed is:

1. A method for input impedance measurements in a communication system having a near-end terminal and at least one far-end terminal, the near-end terminal being capable of communicating instructions to the far-end terminal, the method comprising the steps of:
   the near-end terminal instructing the far-end terminal to exercise a first state of impedance;
   the near-end terminal performing a first echo measurement and recording the measurement result;
   in accordance with a predetermined signaling scheme, the near-end terminal instructing the far-end terminal to change its impedance from a first state to a second state, the second state of impedance being different from the first state;
   the near-end terminal performing a second echo measurement and recording the measurement result; and
   utilizing the difference between the first and the second states of impedance in a processing means to determine a relation there between as a basis for one or more of loop qualification, fault detection and fault localization on a communication line between the near-end and the far-end terminals.

2. The method according to claim 1, wherein alteration of impedance is controlled by powering on/off the far-end terminal, when the far-end terminal is powered remotely from the near-end terminal.

3. The method according to claim 1, wherein the signaling scheme is an initialization process for establishing communication between the near-end terminal and the far-end terminal, a so-called handshake process, and whereby the change of impedance states is made during the handshake process.

4. The method according to claim 1, wherein the first state and the second state of impedance are accomplished using at least one of a line driver and a line receiver.

5. The method according to claim 1, wherein the impedances are values between open and short-circuited impedances, whereby at least two different impedance values between open and short-circuited values are attainable.

6. The method according to claim 1, wherein a transceiver of the far-end terminal is set in a state which normally does not occur during ordinary transmission and reception operation, so as to change the state of impedance.

7. The method according to claim 1, wherein the communication system is a time-division duplex (TDD) system.

8. The method according claim 1, wherein the signaling scheme comprises a request signal being sent from the near-end terminal to the far-end terminal for the far-end terminal to change from the first state of impedance to the second state of impedance.

9. The method according claim 8, wherein the request signal is sent during specific periods of time when a far-end transmitter of the far-end terminal is in a start-up phase.

10. The method according claim 1, wherein the signaling scheme comprises monitoring and detection by the near-end terminal of timing of the far-end terminal's states of operation by measuring a time duration of when handshake tones are transmitted or not.

11. The method according to claim 1, wherein either of the first and the second states of impedance corresponds to a matched termination.

12. A near-end terminal node for input impedance measurements in a communication system, the near-end terminal node being adapted to communicate instructions to a far-end terminal node:
   the near-end terminal node instructing the far-end terminal node to exercise a first state of impedance,
   the near-end terminal node performing a first echo measurement and recording the measurement result,
   in accordance with a predetermined signaling scheme, instructing the far-end terminal node to change its impedance from a first state to a second state, the second state of impedance being different from the first state,
   the near-end terminal node performing a second echo measurement and recording the measurement result, and
   utilizing the difference between the first and the second states of impedance in a processing means to determine a relation there between as a basis for one or more of loop qualification fault detection and fault localization on a communication line between the near-end and the far-end terminal nodes.

13. The near-end terminal node according to claim 12, wherein when the far-end terminal node is remotely controlled by powering on/off from the near-end terminal node, thereby altering the impedance of the far-end terminal node.

14. The near-end terminal node according to claim 12, wherein the near-end terminal node being a distribution point unit (DPU) and the far-end terminal node being a piece of customer premises equipment (CPE).

15. The near-end terminal node according to claim 12, wherein the far-end terminal node comprises transceiver circuitry for altering input impedance.

16. A system for input impedance measurements in a communication system comprising:
   a near-end terminal node and at least one far-end terminal node, the near-end terminal being capable of communicating instructions to the far-end terminal node,
   the near-end terminal node instructing the far-end terminal node to exercise a first state of impedance,
   the near-end terminal node performing a first echo measurement and recording the measurement result,
   in accordance with a predetermined signaling scheme, instructing the far-end terminal node to change its impedance from a first state to a second state, the second state of impedance being different from the first state,
   the near-end terminal node performing a second echo measurement and recording the measurement result, and
   utilizing the difference between the first and the second states of impedance in a processing means to determine a relation there between as a basis for one or more of loop qualification fault detection and fault localization on a communication line between the near-end and the far-end terminal nodes.

17. The system of claim 16, wherein when the far-end terminal node is remotely controlled by powering on/off from the near-end terminal node, thereby altering the impedance of the far-end terminal node.

18. The system of claim 16, wherein the near-end terminal node being a distribution point unit (DPU) and the far-end terminal node being a piece of customer premises equipment (CPE).

19. The system of claim 16, wherein the far-end terminal node comprises transceiver circuitry for altering input impedance.

20. The system of claim 16, wherein the signaling scheme comprises a request signal being sent from the near-end terminal node to the far-end terminal node for the far-end terminal node to change from the first state of impedance to the second state of impedance.

* * * * *

UNITED STATES PATENT AND TRADEMARK OFFICE
CERTIFICATE OF CORRECTION

| | | |
|---|---|---|
| PATENT NO. | : 9,148,504 B2 | Page 1 of 2 |
| APPLICATION NO. | : 14/117353 | |
| DATED | : September 29, 2015 | |
| INVENTOR(S) | : Berg et al. | |

It is certified that error appears in the above-identified patent and that said Letters Patent is hereby corrected as shown below:

In the specification

In Column 1, Line 14, delete "testing, The" and insert -- testing. The --, therefor.

In Column 1, Line 28, delete "wires, Those" and insert -- wires. Those --, therefor.

In Column 1, Line 39, delete "(VDLS2)." and insert -- (VDSL2). --, therefor.

In Column 1, Line 54, delete "or IDSL" and insert -- or VDSL --, therefor.

In Column 1, Line 65, delete "cable, That" and insert -- cable. That --, therefor.

In Column 2, Line 38, delete "need, for" and insert -- need for --, therefor.

In Column 3, Lines 6-7, delete "the steps of" and insert -- the steps of: --, therefor.

In Column 4, Line 22, delete "is schematic" and insert -- is a schematic --, therefor.

In Column 4, Line 25, delete "states o" and insert -- states of --, therefor.

In Column 4, Line 40, delete "DPL) uses" and insert -- DPU uses --, therefor.

In Column 4, Line 43, delete "Impedance" and insert -- impedance --, therefor.

In Column 5, Line 64, delete "medium, Line" and insert -- medium. Line --, therefor.

In Column 6, Line 35, delete "terminal," and insert -- terminal. --, therefor.

In Column 6, Line 55, delete "the it" and insert -- the --, therefor.

Signed and Sealed this
Twenty-third Day of February, 2016

Michelle K. Lee
*Director of the United States Patent and Trademark Office*

CERTIFICATE OF CORRECTION (continued)
U.S. Pat. No. 9,148,504 B2

In Column 7, Line 17, delete "the OPU" and insert -- the DPU --, therefor.

In Column 8, Line 7, delete "channel This" and insert -- channel. This --, therefor.

In the claims

In Column 9, Line 7, in Claim 8, delete "according claim" and insert -- according to claim --, therefor.

In Column 9, Line 12, in Claim 9, delete "according claim" and insert -- according to claim --, therefor.

In Column 9, Line 15, in Claim 10, delete "according claim" and insert -- according to claim --, therefor.